United States Patent  (10) Patent No.: US 12,218,322 B2
Liu et al.  (45) Date of Patent: Feb. 4, 2025

(54) MANGANESE-LITHIUM SEPARATION PROCESS AND PRE-EXTRACTION SOLUTION PREPARATION PROCESS IN COMPREHENSIVE RECOVERY OF TERNARY BATTERY WASTES, AND METHOD FOR COMPREHENSIVE RECOVERY OF COBALT, NICKEL, MANGANESE AND LITHIUM ELEMENTS FROM TERNARY BATTERY WASTES

(71) Applicant: HUNAN JIN YUAN NEW MATERIALS JOINT STOCK COMPANY LIMITED, Yiyang (CN)

(72) Inventors: Xunbing Liu, Yiyang (CN); Jianjun Ouyang, Yiyang (CN); Xijuan Liu, Yiyang (CN); Shanmu Wu, Yiyang (CN); Xiangping Zhao, Yiyang (CN); Xiongwu Dong, Yiyang (CN); Chaowen Zhang, Yiyang (CN); Quncheng Zhou, Yiyang (CN); Chun Luo, Yiyang (CN); Sanxian Chen, Yiyang (CN)

(73) Assignee: HUNAN JIN YUAN NEW MATERIALS JOINT STOCK COMPANY LIMITED, Yiyang (CN)

( * ) Notice: Subject to any disclaimer, the term of this patent is extended or adjusted under 35 U.S.C. 154(b) by 502 days.

(21) Appl. No.: 17/569,584

(22) Filed: Jan. 6, 2022

(65) Prior Publication Data

US 2022/0166079 A1  May 26, 2022

Related U.S. Application Data

(63) Continuation of application No. PCT/CN2020/109430, filed on Aug. 17, 2020.

(30) Foreign Application Priority Data

Sep. 14, 2019 (CN) .......................... 201910867738.0
Dec. 28, 2019 (CN) .......................... 201911384663.7
Dec. 28, 2019 (CN) .......................... 201911384665.6

(51) Int. Cl.
  *H01M 10/54* (2006.01)
  *C22B 3/00* (2006.01)
  (Continued)

(52) U.S. Cl.
  CPC ............... *H01M 10/54* (2013.01); *C22B 3/08* (2013.01); *C22B 3/22* (2013.01); *C22B 7/007* (2013.01);
  (Continued)

(58) Field of Classification Search
  CPC ............. C22B 3/08; C22B 3/22; C22B 7/007; C22B 23/0461; C22B 26/12; C22B 47/00
  See application file for complete search history.

(56) References Cited

U.S. PATENT DOCUMENTS 8,580,213 B2 * 11/2013 Kobayashi ............. C01G 51/04
  423/139
2019/0152797 A1 * 5/2019 Liu ....................... B01D 9/0031

FOREIGN PATENT DOCUMENTS

CN  106505272 A  3/2017
CN  107196007 A  9/2017
(Continued)

OTHER PUBLICATIONS

Machine translation of CN107653378A (Year: 2018).*
(Continued)

*Primary Examiner* — Brian D Walck
*Assistant Examiner* — Nazmun Nahar Shams (57) ABSTRACT

A manganese-lithium separation process and a pre-extraction solution preparation process in comprehensive recovery
(Continued)

of ternary battery wastes, and a method for comprehensive recovery of cobalt, nickel, manganese and lithium elements from the ternary battery wastes, relates to a method for recycling battery wastes. According to the present disclosure, cobalt and nickel ions are separated from an impurity-removed solution by a hydrolysis method; manganese, lithium and other ions in the impurity-removed solution are free from an extraction procedure, so that most manganese ions are separated and removed by a wet method before extraction, to prevent the manganese ions from entering the extraction system; nickel ions are free from an extraction procedure of full extraction and full back-extraction; and nickel hydroxide is directly precipitated after related impurities are removed by extraction.

7 Claims, 1 Drawing Sheet

(51) Int. Cl.
| | |
|---|---|
| *C22B 3/08* | (2006.01) |
| *C22B 3/22* | (2006.01) |
| *C22B 7/00* | (2006.01) |
| *C22B 26/12* | (2006.01) |
| *C22B 47/00* | (2006.01) |

(52) U.S. Cl.
CPC .......... *C22B 23/0461* (2013.01); *C22B 26/12* (2013.01); *C22B 47/00* (2013.01)

(56) References Cited

FOREIGN PATENT DOCUMENTS

| | | |
|---|---|---|
| CN | 107653378 A | 2/2018 |
| CN | 107828966 A | 3/2018 |
| CN | 109722540 A | 5/2019 |
| CN | 111041217 A | 4/2020 |
| CN | 111092273 A | 5/2020 |
| CN | 111118311 A | 5/2020 |
| WO | 2012026061 A1 | 3/2012 |

OTHER PUBLICATIONS

Li Liangbin et.al. CN109735709A (machine translation) (Year: 2019).*
Honggang Wang et.al. ["Development of a Highly Efficient Hydrometallurgical Recycling Process for Automotive Li-Ion Batteries", J. Sustain. Metall. (2015) 1:168-178] (Year: 2015).*
Internation Search Report of PCT/CN2020/109430, Mailed Nov. 19, 2020.

* cited by examiner

MANGANESE-LITHIUM SEPARATION PROCESS AND PRE-EXTRACTION SOLUTION PREPARATION PROCESS IN COMPREHENSIVE RECOVERY OF TERNARY BATTERY WASTES, AND METHOD FOR COMPREHENSIVE RECOVERY OF COBALT, NICKEL, MANGANESE AND LITHIUM ELEMENTS FROM TERNARY BATTERY WASTES

CROSS-REFERENCE TO RELATED APPLICATIONS

This application is a continuation of International Patent Application No. PCT/CN2020/109430 with a filing date of Aug. 17, 2020, designating the United States, and further claims priority to Chinese Patent Application No. 201910867738.0 with a filing date of Sep. 14, 2019, Chinese Patent Application No. 201911384665.6 with a filing date of Dec. 28, 2019, Chinese Patent Application No. 201911384663.7 with a filing date of Dec. 28, 2019. The content of the aforementioned applications, including any intervening amendments thereto, are incorporated herein by reference.

TECHNICAL FIELD

The present invention relates to a method for recycling battery wastes.

BACKGROUND OF THE PRESENT INVENTION

In the processes of disassembling waste ternary battery materials to recycle cobalt, nickel, manganese and lithium, the following method is adopted in the prior art: waste ternary batteries are disassembled to obtain waste cathode material powder, are subjected to the operations of acid leaching and removal of copper, iron, aluminum, calcium and magnesium to obtain a pre-extraction solution, and then generally enter into two process routes as follows. The first one is that a mixed salt solution of cobalt, nickel and manganese is obtained by full extraction and full back-extraction, and then is compounded to synthesize a ternary precursor with sodium hydroxide for recycling; and the second one is that high-concentration pure cobalt sulfate, nickel sulfate and manganese sulfate solutions are obtained by fractional extraction and separation, and then are evaporated, concentrated and crystallized respectively to prepare battery-grade crystals of cobalt sulfate, nickel sulfate and manganese sulfate for recycling. The process routes that the ternary precursor is prepared from the mixed salt solution or the monomer crystals of cobalt sulfate, nickel sulfate and manganese sulfate are prepared by fractional extraction have a problem of high production cost due to the inevitable process routes of extraction and back extraction in the recovery of cobalt, nickel and manganese elements. However, the total number of moles of extracted metal ions determines the production cost. Therefore, the current process routes of recycling waste ternary batteries severely restrict the recycling of waste ternary batteries due to the high cost of extraction processes. For example, the Chinese patent publication number CN110512080A with a publication date of Nov. 29, 2019 discloses a method for separating and recovering valuable metals from waste nickel-cobalt-manganese lithium ion batteries, including the following steps: a, disassembling, discharging and crushing the waste nickel-cobalt-manganese lithium ion batteries, and leaching the crushed waste battery pieces with acid and a reducing agent solution to obtain a leaching solution; b, adding a valuable metal alkali solution into the leaching solution to adjust the pH to 1.5-2.5, heating up to 60-90° C., adding 1-10 times of nickel powder to remove copper, reacting for 10-30 min, stopping heating, adding hydrogen peroxide or sodium hypochlorite to oxidize ferrous iron into ferric iron, adding the valuable metal alkali solution to adjust the pH to 4.2-4.5, removing iron and aluminum, reacting for 0.5-3 h, and performing solid-liquid separation to obtain an impurity-removed solution containing nickel, cobalt, manganese and lithium; c, saponifying diluted P204 with lithium hydroxide solution, extracting the impurity-removed solution to extract all nickel, cobalt and manganese onto P204, washing with pure water as an extractant, and then performing back extraction with sulfuric acid, wherein the raffinate is a lithium-containing solution, and the back-extraction solution is a mixed solution of nickel, cobalt and manganese; and d, adding carbonate or feeding carbon dioxide gas into the raffinate to precipitate lithium, filtering and washing precipitates to obtain lithium carbonate, and returning the filtrate and washing water to the leaching section. The method mainly has the disadvantages of complicated process, long preparation procedure and high production cost since manganese and lithium ions can only be separated and recovered by extraction.

SUMMARY OF PRESENT INVENTION

Technical Problems

The process routes that a ternary precursor is prepared from a mixed salt solution or monomer crystals of cobalt sulfate, nickel sulfate and manganese sulfate are prepared by fractional extraction have a problem of high production cost due to the inevitable process routes of extraction and back extraction in the recovery of cobalt, nickel and manganese elements. However, the total number of moles of extracted metal ions determines the production cost. Therefore, the current process routes of recycling waste ternary batteries severely restrict the recycling of waste ternary batteries due to the high cost of extraction processes.

A first purpose of the present invention is to overcome the defects of the prior art, and disclose a manganese-lithium separation process in the comprehensive recovery of ternary battery wastes. In the manganese-lithium separation process, most of cobalt and nickel ions are removed from an impurity-removed solution; then, sodium sulfide is added to make residual cobalt and nickel ions in the solution form precipitates of cobalt sulfide and nickel sulfide; next, cobalt and nickel ions are further separated; and then, manganese ions are removed by a hydrolysis method, thereby achieving the purpose of separating manganese and lithium and recovering manganese and lithium ions respectively without extraction operation.

A second purpose of the present invention is to solve the problem of complicated process and high production cost due to the inevitable process routes of extraction and back extraction in the recovery of cobalt, nickel, manganese and lithium elements in the prior art, and disclose a pre-extraction solution preparation process in the comprehensive recovery of ternary battery wastes. In the pre-extraction solution preparation process cobalt and nickel ions are separated from the impurity-removed solution by the hydrolysis method; and the manganese, lithium and other ions in the impurity-removed solution are recovered without the extraction process, thereby reducing the production cost.

A third purpose of the present invention is to solve the problem of high recovery cost due to the inevitable process routes of extraction and back extraction in the recovery of cobalt, nickel and manganese elements in the prior art, and disclose a method for the comprehensive recovery of cobalt, nickel, manganese and lithium elements from the ternary battery wastes, wherein the method has simple process, reduces material consumption and energy consumption, and significantly reduces production cost.

Technical Solutions

A first technical solution adopted by the present invention is that the manganese-lithium separation process in the comprehensive recovery of ternary battery wastes includes the following steps:
- a, disassembling waste ternary batteries to obtain waste ternary battery powder, and leaching the waste ternary battery powder with an acid for removing copper, iron and aluminum to obtain an impurity-removed solution;
- b, adjusting the pH of the impurity-removed solution to 5.5-6.5, preferably 6, with sodium hydroxide, precipitating a mixture of cobalt hydroxide and nickel hydroxide, filtering and washing to obtain a filtrate and a washing solution, and allowing the filtrate and the washing solution to enter into a manganese-lithium separation operation procedure;
- c, adjusting the pH of the washing solution and the filtrate to 4.5-5.0 with dilute sulfuric acid, adding solid sodium sulfide according to 2.0-4.0 times, preferably 2.5-3.5 times or 3 times, of the total amount of cobalt and nickel, and reacting for 30-65 min, preferably 35-60 min, 40-55 min or 45-50 min, so that the residual cobalt and nickel ions in the solution form precipitates of cobalt sulfide and nickel sulfide, filtering and washing the precipitates to obtain a filter cake, a filtrate and a washing solution, wherein the filter cake is a mixture of cobalt sulfide and nickel sulfide and is returned to the acid dissolution procedure, and the filtrate and the washing solution enter into a manganese precipitation procedure;
- d, adjusting the pH of the filtrate and the washing solution obtained in the step c to 8-11, preferably 9-10, with sodium hydroxide, reacting for 30-120 min, preferably 40-110 min, 50-100 min, 60-90 min or 70-80 min, precipitating manganese ions, and filtering and washing the precipitates to obtain a manganese hydroxide filter cake and a lithium-containing filtrate and washing solution;
- e, evaporating, concentrating and crystallizing the lithium-containing filtrate and washing solution to remove sodium sulfate and then obtain a concentrated lithium solution;
- f, precipitating lithium carbonate with a saturated sodium carbonate solution, and filtering and washing to obtain a lithium carbonate filter cake and a lithium precipitation mother liquor;
- g, returning the lithium precipitation mother liquor to the procedure of preparing the impurity-removed solution to be used as an alkali liquor for adjusting pH, to recover residual lithium ions in the lithium precipitation mother liquor.

Further, the dilute sulfuric acid obtained in the step c is 1-4N sulfuric acid solution.

Further, sodium hydroxide in the step d is liquid alkali with a concentration of less than 32% or solid sodium hydroxide.

Further, the concentration of the liquid alkali is 1-32%, preferably 15-30%.

A second technical solution adopted by the present invention is that a pre-extraction solution preparation process in comprehensive recovery of ternary battery wastes includes: disassembling waste ternary batteries to obtain waste ternary battery powder; leaching the waste ternary battery powder with an acid for removing copper, iron and aluminum to obtain an impurity-removed solution; then adjusting the pH with sodium hydroxide; precipitating cobalt and nickel ions into a mixture of cobalt hydroxide and nickel hydroxide, so that the cobalt and nickel ions are separated from lithium and manganese ions in the solution; dissolving the mixture of cobalt hydroxide and nickel hydroxide with sulfuric acid; and then removing calcium and magnesium ions with fluoride to obtain a pre-extraction solution available for preparing battery-grade cobalt sulfate.

A third technical solution adopted by the present invention is that the pre-extraction solution preparation process in the comprehensive recovery of ternary battery wastes includes the following steps:
- a, disassembling waste ternary batteries to obtain waste ternary battery powder, and leaching the waste ternary battery powder with an acid for removing copper, iron and aluminum to obtain an impurity-removed solution;
- b, adjusting the pH of the impurity-removed solution to 5.5-6.5 with sodium hydroxide; precipitating a mixture of cobalt hydroxide and nickel hydroxide; and filtering and washing the precipitates to obtain a filter cake, which is the mixture of cobalt hydroxide and nickel hydroxide;
- c, dissolving the mixture of cobalt hydroxide and nickel hydroxide with sulfuric acid with a concentration of 50-80% to form a mixed solution of cobalt sulfate and nickel sulfate;
- d, adjusting the pH of the mixed solution of cobalt sulfate and nickel sulfate to 5.0-6.0 with the mixture of cobalt hydroxide and nickel hydroxide, filtering to obtain a filter cake, and returning the filter cake to the step c for continuing to dissolve;
- e, removing calcium and magnesium ions in the filtrate with fluoride;
- f, filtering and washing, and allowing the filtrate to enter into a P204 impurity extraction procedure as a P204 pre-extraction solution.

Further, sodium hydroxide is liquid alkali with the concentration of 1-32%, preferably 5-10%, 25-31%, 15-30% or 20% or solid sodium hydroxide.

Further, the concentration of sulfuric acid is 55-75%, preferably 60-70%, preferably 65%.

Further, the fluoride is one or a mixture of more of sodium fluoride, ammonium fluoride and potassium fluoride.

Further, in the step of adding fluoride to remove calcium and magnesium ions, the added object sodium fluoride is 5-10 times, preferably 6-9 times or 7-8 times of the total amount of calcium and magnesium ions in the dissolving solution.

Further, after the object sodium fluoride is added, the reaction time is controlled to be 10-60 min, preferably 15-55 min, 20-50 min, 25-45 min or 30-40 min, and the reaction temperature is controlled to be 60-90° C., preferably 65-85° C. or 70-80° C. to precipitate the calcium and magnesium ions.

A fourth technical solution adopted by the present invention is that the method for the comprehensive recovery of cobalt, nickel, manganese and lithium elements from the ternary battery wastes includes the following steps:

a, disassembling waste ternary batteries to obtain waste ternary battery powder, and leaching the waste ternary battery powder with an acid for removing copper, iron and aluminum to obtain an impurity-removed solution; characterized in that:

b, adjusting the pH of the impurity-removed solution to 5.5-6.5 with sodium hydroxide, precipitating the mixture of cobalt hydroxide and nickel hydroxide, filtering and washing to obtain a filter cake and a filtrate, and treating the filter cake and the filtrate respectively;

c, dissolving the filter cake, which is a mixture of cobalt hydroxide and nickel hydroxide, with sulfuric acid, then, adjusting the pH to about 5.0-6.0, adding fluoride into the dissolving solution to remove calcium and magnesium ions, filtering and washing to obtain a filtrate, allowing the filtrate to enter into a P204 impurity extraction procedure, removing impurities deeply, allowing raffinate to enter into a P507 extraction procedure, performing P507 cobalt ion full extraction and full back-extraction to obtain a high-concentration pure solution of cobalt sulfate, evaporating and crystallizing the solution to obtain a battery-grade cobalt sulfate product, and allowing a nickel sulfate solution as the raffinate to enter into a CY272 impurity extraction procedure;

d, obtaining pure nickel sulfate liquid as the raffinate after the CY272 impurity extraction procedure, adjusting the pH to 6-10 with sodium hydroxide, precipitating nickel hydroxide, reversely washing the precipitates with pure water for 2-4 times, preferably 3 times, to obtain a filter cake, a filtrate and a washing solution, wherein the filter cake is battery-grade nickel hydroxide, and the filtrate and the washing solution are treated by a wastewater station for recycling;

e, adding sodium sulfide into the filtrate and the washing solution obtained in the step b to remove the residual cobalt and nickel ions, filtering and washing to obtain a filter cake, a filtrate and a filtering solution, wherein the filter cake is a mixture of cobalt sulfide and nickel sulfide and is returned to the acid dissolution procedure, and the filtrate and the washing solution enter into the manganese precipitation procedure;

f, adjusting the pH of the filtrate and the washing solution obtained in the step e to 8-11, preferably 9-10, with sodium hydroxide, to precipitate manganese ions, filtering and washing to obtain a manganese hydroxide filter cake and a lithium-containing filtrate and washing solution;

g, evaporating and crystallizing sodium sulfate from the lithium-containing filtrate and washing solution to obtain a concentrated lithium solution, precipitating lithium carbonate with sodium carbonate, filtering and washing to obtain a lithium carbonate filter cake and a lithium precipitation mother liquor, and returning the lithium precipitation mother liquor to the procedure of removing iron and aluminum to be used as an alkali liquor for adjusting pH.

Further, the sodium hydroxide is liquid alkali with a concentration of less than 32% or solid sodium hydroxide.

Further, the concentration of the liquid alkali is 1-32% or 15-30%.

Further, the pH of the impurity-removed solution is adjusted to 6-6.2 with sodium hydroxide.

Further, the sulfuric acid in the step c is 5-80%, preferably 30-78%, 40-77%, 50-76%, 55-75%, 60-74%, 65-73%, 68-72% or 70%.

Further, in the step c of adding fluoride into the dissolving solution to remove calcium and magnesium ions, the physical sodium fluoride is added by 5-10 times, preferably 6-9 times or 7-8 times of the total amount of calcium and magnesium ions in the dissolving solution; and the reaction lasts for 10-60 min, preferably 15-55 min, 20-50 min, 25-45 min or 30-40 min to precipitate calcium and magnesium ions.

Further, in the step h of adding sodium sulfide, the solid sodium sulfide is added by 2.0-5.0 times, preferably 2.5-4.5 times or 3-4 times of the total amount of cobalt and nickel in the filtrate and the washing solution obtained in the step b; and the reaction lasts for 30-60 minutes, preferably 35-55 minutes or 40-50 minutes to recover the residual cobalt and nickel ions.

Beneficial Effects

By adopting the above technical solutions, the present invention solves the problem of high recovery cost due to the inevitable process routes of extraction and back extraction in the recovery of cobalt, nickel and manganese elements in the prior art. According to the present invention, cobalt and nickel ions are separated from the impurity-removed solution by the hydrolysis method; manganese, lithium and other ions in the impurity-removed solution are free from the extraction procedure, so that most manganese ions are separated and removed by a wet method before extraction, to prevent the manganese ions from entering the extraction system; nickel ions are free from an extraction procedure of full extraction and full back-extraction; and nickel hydroxide is directly precipitated after related impurities are removed by extraction. The method provided by the present invention has simple process, reduces material consumption and energy consumption, and saves the production cost by at least 20%.

DETAILED DESCRIPTION OF OPTIMUM EMBODIMENTS

Optimum implementation 1: a manganese-lithium separation process in the comprehensive recovery of ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, adjusting the pH of the impurity-removed solution to 6 with sodium hydroxide with a concentration of 30%, precipitating a mixture of cobalt hydroxide and nickel hydroxide, filtering and washing to obtain a filtrate and a washing solution, and allowing the filtrate and the washing solution to enter into a manganese-lithium separation operation procedure;

c, pumping 15 m$^3$ of washing solution and filtrate into a reaction kettle of 20 m$^3$, adjusting the pH to 5.0 with 2N sulfuric acid solution, adding solid sodium sulfide according to 4.0 times of the total amount of cobalt and nickel, and reacting for 45 min, so that the residual cobalt and nickel ions in the solution form precipitates of cobalt sulfide and nickel sulfide, filtering and washing the precipitates with a plate-and-frame filter press of 60 m² to obtain a filter cake, a filtrate and a washing solution, wherein the filter cake is a mixture of cobalt sulfide and nickel sulfide and is returned to the acid dissolution procedure, and the filtrate and the washing solution enter into a manganese precipitation procedure;

d, adjusting the pH of the filtrate and the washing solution obtained in the step c to 9.5 with solid sodium hydroxide, reacting for 120 min, precipitating manganese ions, filtering and washing the precipitates with the plate-and-frame filter press of 60 m² to obtain a manganese hydroxide filter cake and a lithium-containing filtrate and washing solution;

e, evaporating, concentrating and crystallizing the lithium-containing filtrate and washing solution to remove sodium sulfate and then obtain a concentrated lithium solution;

f, precipitating lithium carbonate with a saturated sodium carbonate solution, and filtering and washing to obtain a lithium carbonate filter cake and a lithium precipitation mother liquor;

g, returning the lithium precipitation mother liquor to the procedure of preparing the impurity-removed solution to be used as an alkali liquor for adjusting pH, to recover residual lithium ions in the lithium precipitation mother liquor.

Optimum implementation 2: a pre-extraction solution preparation process in the comprehensive recovery of ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, pumping 15 m³ of impurity-removed solution into the reaction kettle of 20 m³, adjusting the pH of the impurity-removed solution to 6.1 with a sodium hydroxide solution with a concentration of 10%, precipitating a mixture of cobalt hydroxide and nickel hydroxide, and filtering and washing the precipitates with an automatic plate-and-frame filter press of 60 m² to obtain a filter cake, which is the mixture of cobalt hydroxide and nickel hydroxide;

c, dissolving the mixture of cobalt hydroxide and nickel hydroxide with sulfuric acid with a concentration of 60% in the reaction kettle of 20 m³ to form a mixed solution of cobalt sulfate and nickel sulfate;

d, adjusting the pH of the mixed solution of cobalt sulfate and nickel sulfate to 5.5 with the mixture of cobalt hydroxide and nickel hydroxide, filtering with the automatic plate-and-frame filter press of 60 m² to obtain a filter cake, and returning the filter cake to the step c for continuing to dissolve;

e, pumping 15 m³ of a mixed solution of cobalt sulfate and nickel sulfate into the reaction kettle of 20 m³, adding fluoride according to 6 times of the total amount of calcium and magnesium ions in the solution, keeping the reaction temperature at 70° C., and reacting for 45 min to remove the calcium and magnesium ions;

f, filtering and washing, and allowing the filtrate to enter into a P204 impurity extraction procedure as a P204 pre-extraction solution.

Optimum implementation 3: a method for the comprehensive recovery of cobalt, nickel, manganese and lithium elements from the ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, adjusting the pH of the impurity-removed solution to 6.1 with sodium hydroxide solution with a concentration of 20%, precipitating the mixture of cobalt hydroxide and nickel hydroxide, filtering and washing to obtain a filter cake and a filtrate, and treating the filter cake and the filtrate respectively;

c, slowly adding the mixture of cobalt hydroxide and nickel hydroxide into a sulfuric acid solution with a concentration of 60%, adjusting the pH to 5.5 with the mixture of cobalt hydroxide and nickel hydroxide; adding the physical fluoride according to 6 times of the total amount of calcium and magnesium ions in the dissolving solution, reacting for 45 min, filtering and washing to obtain a filter cake and a filtrate, wherein the filter cake is calcium-magnesium slag and is treated separately; allowing the filtrate to enter into the P204 impurity extraction procedure for impurity-removal extraction to extract and remove a small amount of manganese, iron, zinc and other impurities brought by the mixture of cobalt hydroxide and nickel hydroxide; allowing the raffinate mainly containing cobalt and nickel ions to enter into the P507 extraction procedure; performing P507 cobalt ion full extraction and full back-extraction to obtain a high-concentration pure solution of cobalt sulfate; evaporating and crystallizing the solution to prepare a battery-grade cobalt sulfate product; and allowing a nickel sulfate as the raffinate solution to enter into a CY272 impurity extraction procedure;

d, obtaining pure nickel sulfate liquid as the raffinate after the CY272 impurity extraction procedure, adjusting the pH to 9.5 with a sodium hydroxide solution with the concentration of 20%, precipitating nickel hydroxide, reversely washing the precipitates with pure water for 3 times to obtain a filter cake, a filtrate and a washing solution, wherein the filter cake is battery-grade nickel hydroxide, and the filtrate and the washing solution are treated by a wastewater station for recycling;

e, adding solid sodium sulfide according to 4.0 times of the total amount of cobalt and nickel into the filtrate and the washing solution obtained in the step b, reacting for 45 min, filtering and washing to obtain a filter cake, a filtrate and a washing solution, wherein the filter cake is a mixture of cobalt sulfide and nickel sulfide and is returned to the acid dissolution procedure, and the filtrate and the washing solution enter into the manganese precipitation procedure;

f, adjusting the pH of the filtrate and the washing solution obtained in the step e to 9.5 with the sodium hydroxide solution with the concentration of 20%, reacting for 60 min, filtering and washing to obtain a manganese hydroxide filter cake and a lithium-containing filtrate and washing solution;

g, evaporating, concentrating and centrifuging the lithium-containing filtrate and washing solution to remove crystallized sodium sulfate and obtain a concentrated lithium solution, precipitating lithium carbonate with sodium carbonate, filtering and washing to obtain a lithium carbonate filter cake and a lithium precipitation mother liquor, and returning the lithium precipitation mother liquor to the procedure of removing iron and aluminum to be used as an alkali liquor for adjusting pH.

DETAILED DESCRIPTION OF PREFERRED EMBODIMENTS

Figure 1:
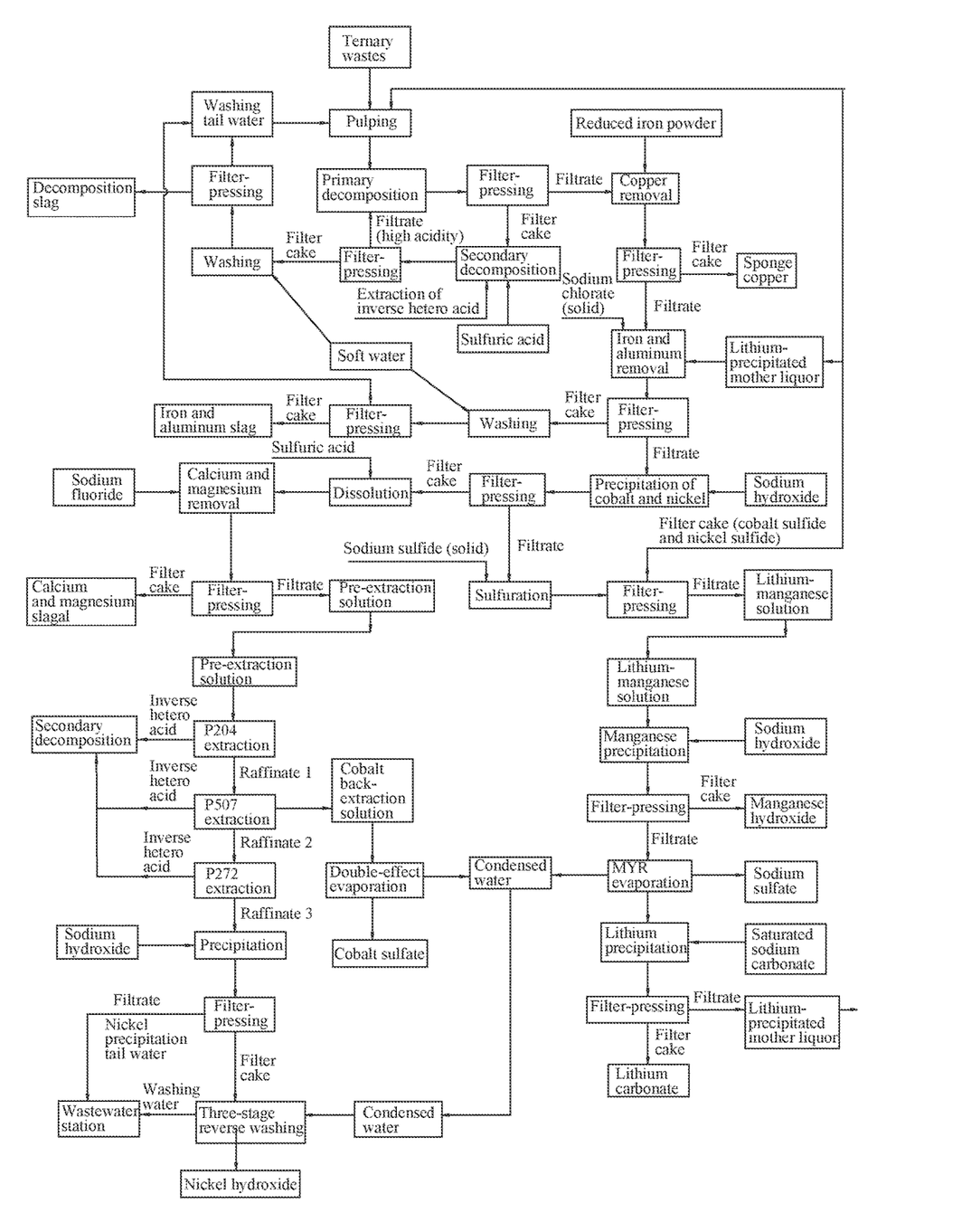
FIG. 1 is a process flow chart of the present invention.

To understand the present invention more clearly, the present invention will be further described below with specific implementation and embodiments with reference to FIG. 1.

Implementation 1: a manganese-lithium separation process in the comprehensive recovery of ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, adjusting the pH of the impurity-removed solution to 5.5-6.5, preferably 6, with sodium hydroxide, precipitating a mixture of cobalt hydroxide and nickel hydroxide, filtering and washing to obtain a filtrate and a washing solution, and allowing the filtrate and the washing solution to enter into a manganese-lithium separation operation procedure;

c, adjusting the pH of the washing solution and the filtrate to 4.5-5.0 with dilute sulfuric acid, adding solid sodium sulfide according to 2.0-4.0 times, preferably 2.5-3.5 times or 3 times, of the total amount of cobalt and nickel, reacting for 30-65 min, preferably 35-60 min, 40-55 min or 45-50 min, so that the residual cobalt and nickel ions in the solution form precipitates of cobalt sulfide and nickel sulfide, and filtering and washing the precipitates to obtain a filter cake, a filtrate and a washing solution, wherein the filter cake is a mixture of cobalt sulfide and nickel sulfide and is returned to the acid dissolution procedure, and the filtrate and the washing solution enter into a manganese precipitation procedure;

d, adjusting the pH of the filtrate and the washing solution obtained in the step c to 8-11, preferably 9-10, with sodium hydroxide, reacting for 30-120 min, preferably 40-110 min, 50-100 min, 60-90 min or 70-80 min, precipitating manganese ions, and filtering and washing the precipitates to obtain a manganese hydroxide filter cake and a lithium-containing filtrate and washing solution;

e, evaporating, concentrating and crystallizing the lithium-containing filtrate and washing solution to remove sodium sulfate and then obtain a concentrated lithium solution;

f, precipitating lithium carbonate with a saturated sodium carbonate solution, and filtering and washing to obtain a lithium carbonate filter cake and a lithium precipitation mother liquor;

g, returning the lithium precipitation mother liquor to the procedure of preparing the impurity-removed solution to be used as an alkali liquor for adjusting pH, to recover residual lithium ions in the lithium precipitation mother liquor.

Further, the dilute sulfuric acid obtained in the step c is 1-4N sulfuric acid solution.

Further, the sodium hydroxide in the step d is liquid alkali with a concentration of less than 32% or solid sodium hydroxide.

Further, the concentration of the liquid alkali is 1-32%, preferably 15-30%.

Implementation 2: a pre-extraction solution preparation process in the comprehensive recovery of ternary battery wastes includes: disassembling waste ternary batteries to obtain waste ternary battery powder; leaching the waste ternary battery powder with an acid for removing copper, iron and aluminum to obtain an impurity-removed solution; then adjusting the pH with sodium hydroxide; precipitating cobalt and nickel ions into a mixture of cobalt hydroxide and nickel hydroxide, so that the cobalt and nickel ions are separated from lithium and manganese ions in the solution; dissolving the mixture of cobalt hydroxide and nickel hydroxide with sulfuric acid; and then removing calcium and magnesium ions with fluoride to obtain a pre-extraction solution available for preparing battery-grade cobalt sulfate.

Implementation 3: the pre-extraction solution preparation process in the comprehensive recovery of ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, adjusting the pH of the impurity-removed solution to 5.5-6.5 with sodium hydroxide; precipitating a mixture of cobalt hydroxide and nickel hydroxide; and filtering and washing the precipitates to obtain a filter cake, which is the mixture of cobalt hydroxide and nickel hydroxide;

c, dissolving the mixture of cobalt hydroxide and nickel hydroxide with sulfuric acid with a concentration of 50-80% to form a mixed solution of cobalt sulfate and nickel sulfate;

d, adjusting the pH of the mixed solution of cobalt sulfate and nickel sulfate to 5.0-6.0 with the mixture of cobalt hydroxide and nickel hydroxide, filtering to obtain a filter cake, and returning the filter cake to the step c for continuing to dissolve;

e, removing calcium and magnesium ions in the filtrate with fluoride; and f, filtering and washing, and allowing the filtrate to enter into a P204 impurity extraction procedure as a P204 pre-extraction solution.

Further, sodium hydroxide is liquid alkali with the concentration of 1-32%, preferably 5-10%, 25-31%, 15-30% or 20% or solid sodium hydroxide.

Further, the concentration of sulfuric acid is 55-75%, preferably 60-70%, preferably 65%.

Further, the fluoride is one or a mixture of more of sodium fluoride, ammonium fluoride and potassium fluoride.

Further, in the step of adding fluoride to remove calcium and magnesium ions, the added object sodium fluoride is 5-10 times, preferably 6-9 times or 7-8 times of the total amount of calcium and magnesium ions in the dissolving solution.

Further, after the object sodium fluoride is added, the reaction time is controlled to be 10-60 min, preferably 15-55 min, 20-50 min, 25-45 min or 30-40 min, and the reaction temperature is controlled to be 60-90° C., preferably 65-85° C. or 70-80° C. to precipitate the calcium and magnesium ions.

Implementation 4: the method for the comprehensive recovery of cobalt, nickel, manganese and lithium elements from the ternary battery wastes includes the following steps:

a, disassembling waste ternary batteries to obtain waste ternary battery powder, and leaching the waste ternary battery powder with an acid for removing copper, iron and aluminum to obtain an impurity-removed solution; characterized in that:

b, adjusting the pH of the impurity-removed solution to 5.5-6.5 with sodium hydroxide, precipitating the mixture of cobalt hydroxide and nickel hydroxide, filtering and washing to obtain a filter cake and a filtrate, and treating the filter cake and the filtrate respectively;

c, dissolving the filter cake, which is a mixture of cobalt hydroxide and nickel hydroxide, with sulfuric acid, then, adjusting the pH to about 5.0-6.0, adding fluoride into the dissolving solution to remove calcium and magnesium ions, filtering and washing to obtain a filtrate, allowing the filtrate to enter into a P204 impurity extraction procedure, removing impurities deeply, allowing raffinate to enter into a P507 extraction procedure, performing P507 cobalt ion full extraction and full back-extraction to obtain a high-concentration pure solution of cobalt sulfate, evaporating and crystallizing the solution to obtain a battery-grade cobalt sulfate product, and allowing a nickel sulfate solution as the raffinate to enter into a CY272 impurity extraction procedure;

d, obtaining pure nickel sulfate liquid as the raffinate after the CY272 impurity extraction procedure, adjusting the pH to 6-10 with sodium hydroxide, precipitating nickel hydroxide, reversely washing the precipitates with pure water for 2-4 times, preferably 3 times, to obtain a filter cake, a filtrate and a washing solution, wherein the filter cake is battery-grade nickel hydroxide, and the filtrate and the washing solution are treated by a wastewater station for recycling;

e, adding sodium sulfide into the filtrate and the washing solution obtained in the step b to remove the residual cobalt and nickel ions, filtering and washing to obtain a filter cake, a filtrate and a filtering solution, wherein the filter cake is a mixture of cobalt sulfide and nickel sulfide and is returned to the acid dissolution procedure, and the filtrate and the washing solution enter into the manganese precipitation procedure;

f, adjusting the pH of the filtrate and the washing solution obtained in the step e to 8-11, preferably 9-10, with sodium hydroxide, to precipitate manganese ions, filtering and washing to obtain a manganese hydroxide filter cake and a lithium-containing filtrate and washing solution;

g, evaporating and crystallizing sodium sulfate from the lithium-containing filtrate and washing solution to obtain a concentrated lithium solution, precipitating lithium carbonate with sodium carbonate, filtering and washing to obtain a lithium carbonate filter cake and a lithium precipitation mother liquor, and returning the lithium precipitation mother liquor to the procedure of removing iron and aluminum to be used as an alkali liquor for adjusting pH.

Further, the sodium hydroxide is liquid alkali with a concentration of less than 32% or solid sodium hydroxide.

Further, the concentration of the liquid alkali is 1-32% or 15-30%.

Further, the pH of the impurity-removed solution is adjusted to 6-6.2 with sodium hydroxide.

Further, the sulfuric acid in the step c is 5-80%, preferably 30-78%, 40-77%, 50-76%, 55-75%, 60-74%, 65-73%, 68-72% or 70%.

Further, in the step c of adding fluoride into the dissolving solution to remove calcium and magnesium ions, the physical sodium fluoride is added by 5-10 times, preferably 6-9 times or 7-8 times of the total amount of calcium and magnesium ions in the dissolving solution; and the reaction lasts for 10-60 min, preferably 15-55 min, 20-50 min, 25-45 min or 30-40 min to precipitate calcium and magnesium ions.

Further, in the step h of adding sodium sulfide, the solid sodium sulfide is added by 2.0-5.0 times, preferably 2.5-4.5 times or 3-4 times of the total amount of cobalt and nickel in the filtrate and the washing solution obtained in the step b; and the reaction lasts for 30-60 minutes, preferably 35-55 minutes or 40-50 minutes to recover the residual cobalt and nickel ions.

Implementation 5: the method for the comprehensive recovery of cobalt, nickel, manganese and lithium elements from the ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, adjusting the pH of the impurity-removed solution to 5.5-6.5 with sodium hydroxide, precipitating the mixture of cobalt hydroxide and nickel hydroxide, filtering and washing to obtain a filter cake and a filtrate, and treating the filter cake and the filtrate respectively;

c, dissolving the filter cake, which is a mixture of cobalt hydroxide and nickel hydroxide, with sulfuric acid, then, adjusting the pH to about 5.0-6.0, adding fluoride into the dissolving solution to remove calcium and magnesium ions, filtering and washing to obtain a filtrate, allowing the filtrate to enter into a P204 impurity extraction procedure, removing impurities deeply, allowing raffinate to enter into a P507 extraction procedure, performing P507 cobalt ion full extraction and full back-extraction to obtain a high-concentration pure solution of cobalt sulfate, evaporating and crystallizing the solution to obtain a battery-grade cobalt sulfate product, and allowing a nickel sulfate solution as the raffinate to enter into a CY272 impurity extraction procedure;

d, obtaining pure nickel sulfate liquid as the raffinate after the CY272 impurity extraction procedure, adjusting the pH to 6-10 with sodium hydroxide, precipitating nickel hydroxide, reversely washing the precipitates with pure water for 2-4 times, preferably 3 times, to obtain a filter cake, a filtrate and a washing solution, wherein the filter cake is battery-grade nickel hydroxide, and the filtrate and the washing solution are treated by a wastewater station for recycling;

e, adding sodium sulfide into the filtrate and the washing solution obtained in the step b to remove the residual cobalt and nickel ions, filtering and washing to obtain a filter cake, a filtrate and a filtering solution, wherein the filter cake is a mixture of cobalt sulfide and nickel sulfide and is returned to the acid dissolution procedure, and the filtrate and the washing solution enter into the manganese precipitation procedure;

f, adjusting the pH of the filtrate and the washing solution obtained in the step e to 8-11, preferably 9-10, with sodium hydroxide, to precipitate manganese ions, filtering and washing to obtain a manganese hydroxide filter cake and a lithium-containing filtrate and washing solution;

g, evaporating and crystallizing sodium sulfate from the lithium-containing filtrate and washing solution to obtain a concentrated lithium solution, precipitating lithium carbonate with sodium carbonate, filtering and washing to obtain a lithium carbonate filter cake and a lithium precipitation mother liquor, and returning the lithium precipitation mother liquor to the procedure of removing iron and aluminum to be used as an alkali liquor for adjusting pH.

Further, the sodium hydroxide is liquid alkali with a concentration of less than 32% or solid sodium hydroxide.

Further, the concentration of the liquid alkali is 1-32% or 15-30%.

Further, the pH of the impurity-removed solution is adjusted to 6-6.2 with sodium hydroxide.

Further, the fluoride in the step c is one of sodium fluoride, ammonium fluoride and potassium fluoride.

Further, the concentration of the sulfuric acid in the step c is 5-80%, preferably 30-78%, 40-77%, 50-76%, 55-75%, 60-74%, 65-73%, 68-72% or 70%.

Further, in the step c of adding fluoride into the dissolving solution to remove calcium and magnesium ions, the physical sodium fluoride is added by 5-10 times, preferably 6-9 times or 7-8 times of the total amount of calcium and magnesium ions in the dissolving solution; and the reaction lasts for 10-60 min, preferably 15-55 min, 20-50 min, 25-45 min or 30-40 min to precipitate calcium and magnesium ions.

Further, in the step h of adding sodium sulfide, the solid sodium sulfide is added by 2.0-5.0 times, preferably 2.5-4.5 times or 3-4 times of the total amount of cobalt and nickel in the filtrate and the washing solution obtained in the step b; and the reaction lasts for 30-60 minutes, preferably 35-55 minutes or 40-50 minutes to recover the residual cobalt and nickel ions.

Embodiment 1: a manganese-lithium separation process in the comprehensive recovery of ternary battery wastes includes the following steps:
- a, disassembling waste ternary batteries to obtain waste ternary battery powder, and leaching the waste ternary battery powder with an acid for removing copper, iron and aluminum to obtain an impurity-removed solution;
- b, adjusting the pH of the impurity-removed solution to 5.5 with sodium hydroxide with a concentration of 1%, precipitating a mixture of cobalt hydroxide and nickel hydroxide, filtering and washing to obtain a filtrate and a washing solution, and allowing the filtrate and the washing solution to enter into a manganese-lithium separation operation procedure;
- c, pumping 15 m$^3$ of washing solution and filtrate into a reaction kettle of 20 m$^3$, adjusting the pH to 4.5 with 4N sulfuric acid solution, adding solid sodium sulfide according to 2.0 times of the total amount of cobalt and nickel, reacting for 30 min so that the residual cobalt and nickel ions in the solution form precipitates of cobalt sulfide and nickel sulfide, and filtering and washing the precipitates with a plate-and-frame filter press of 60 m$^2$ to obtain a filter cake, a filtrate and a washing solution, wherein the filter cake is a mixture of cobalt sulfide and nickel sulfide and is returned to the acid dissolution procedure, and the filtrate and the washing solution enter into a manganese precipitation procedure;
- d, adjusting the pH of the filtrate and the washing solution obtained in the step c to 10.0 with solid sodium hydroxide, reacting for 60 min, precipitating manganese ions, filtering and washing the precipitates with the plate-and-frame filter press of 60 m$^2$ to obtain a manganese hydroxide filter cake and a lithium-containing filtrate and washing solution;
- e, evaporating, concentrating and crystallizing the lithium-containing filtrate and washing solution to remove sodium sulfate and then obtain a concentrated lithium solution;
- f, precipitating lithium carbonate with a saturated sodium carbonate solution, and filtering and washing to obtain a lithium carbonate filter cake and a lithium precipitation mother liquor;
- g, returning the lithium precipitation mother liquor to the procedure of preparing the impurity-removed solution to be used as an alkali liquor for adjusting pH, to recover residual lithium ions in the lithium precipitation mother liquor.

Embodiment 2: a manganese-lithium separation process in the comprehensive recovery of ternary battery wastes includes the following steps:
- a, disassembling waste ternary batteries to obtain waste ternary battery powder, and leaching the waste ternary battery powder with an acid for removing copper, iron and aluminum to obtain an impurity-removed solution;
- b, adjusting the pH of the impurity-removed solution to 6.5 with sodium hydroxide with a concentration of 32%, precipitating a mixture of cobalt hydroxide and nickel hydroxide, filtering and washing to obtain a filtrate and a washing solution, and allowing the filtrate and the washing solution to enter into a manganese-lithium separation operation procedure;
- c, pumping 15 m$^3$ of washing solution and filtrate into a reaction kettle of 20 m$^3$, adjusting the pH to 4.7 with 1N sulfuric acid solution, adding solid sodium sulfide according to 3.0 times of the total amount of cobalt and nickel, reacting for 40 min so that the residual cobalt and nickel ions in the solution form precipitates of cobalt sulfide and nickel sulfide, and filtering and washing the precipitates with a plate-and-frame filter press of 60 m$^2$ to obtain a filter cake, a filtrate and a washing solution, wherein the filter cake is a mixture of cobalt sulfide and nickel sulfide and is returned to the acid dissolution procedure, and the filtrate and the washing solution enter into a manganese precipitation procedure;
- d, adjusting the pH of the filtrate and the washing solution obtained in the step c to 9.0 with solid sodium hydroxide, reacting for 60 min, precipitating manganese ions, filtering and washing the precipitates with the plate-and-frame filter press of 60 m$^2$ to obtain a manganese hydroxide filter cake and a lithium-containing filtrate and washing solution;
- e, evaporating, concentrating and crystallizing the lithium-containing filtrate and washing solution to remove sodium sulfate and then obtain a concentrated lithium solution;
- f, precipitating lithium carbonate with a saturated sodium carbonate solution, and filtering and washing to obtain a lithium carbonate filter cake and a lithium precipitation mother liquor;
- g, returning the lithium precipitation mother liquor to the procedure of preparing the impurity-removed solution to be used as an alkali liquor for adjusting pH, to recover residual lithium ions in the lithium precipitation mother liquor.

Embodiment 3: a manganese-lithium separation process in the comprehensive recovery of ternary battery wastes includes the following steps:
- a, disassembling waste ternary batteries to obtain waste ternary battery powder, and leaching the waste ternary battery powder with an acid for removing copper, iron and aluminum to obtain an impurity-removed solution;
- b, adjusting the pH of the impurity-removed solution to 6 with sodium hydroxide with a concentration of 15%, precipitating a mixture of cobalt hydroxide and nickel hydroxide, filtering and washing to obtain a filtrate and a washing solution, and allowing the filtrate and the washing solution to enter into a manganese-lithium separation operation procedure;

c, pumping 15 m$^3$ of washing solution and filtrate into a reaction kettle of 20 m$^3$, adjusting the pH to 4.8 with 4N sulfuric acid solution, adding solid sodium sulfide according to 3.5 times of the total amount of cobalt and nickel, reacting for 60 min so that the residual cobalt and nickel ions in the solution form precipitates of cobalt sulfide and nickel sulfide, and filtering and washing the precipitates with a plate-and-frame filter press of 60 m$^2$ to obtain a filter cake, a filtrate and a washing solution, wherein the filter cake is a mixture of cobalt sulfide and nickel sulfide and is returned to the acid dissolution procedure, and the filtrate and the washing solution enter into a manganese precipitation procedure;

d, adjusting the pH of the filtrate and the washing solution obtained in the step c to 8.5 with solid sodium hydroxide, reacting for 90 min, precipitating manganese ions, filtering and washing the precipitates with the plate-and-frame filter press of 60 m$^2$ to obtain a manganese hydroxide filter cake and a lithium-containing filtrate and washing solution;

e, evaporating, concentrating and crystallizing the lithium-containing filtrate and washing solution to remove sodium sulfate and then obtain a concentrated lithium solution;

f, precipitating lithium carbonate with a saturated sodium carbonate solution, and filtering and washing to obtain a lithium carbonate filter cake and a lithium precipitation mother liquor;

g, returning the lithium precipitation mother liquor to the procedure of preparing the impurity-removed solution to be used as an alkali liquor for adjusting pH, to recover residual lithium ions in the lithium precipitation mother liquor.

Embodiment 4: a manganese-lithium separation process in the comprehensive recovery of ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, adjusting the pH of the impurity-removed solution to 6 with sodium hydroxide with a concentration of 30%, precipitating a mixture of cobalt hydroxide and nickel hydroxide, filtering and washing to obtain a filtrate and a washing solution, and allowing the filtrate and the washing solution to enter into a manganese-lithium separation operation procedure;

c, pumping 15 m$^3$ of washing solution and filtrate into a reaction kettle of 20 m$^3$, adjusting the pH to 5.0 with 2N sulfuric acid solution, adding solid sodium sulfide according to 4.0 times of the total amount of cobalt and nickel, reacting for 45 min so that the residual cobalt and nickel ions in the solution form precipitates of cobalt sulfide and nickel sulfide, and filtering and washing the precipitates with a plate-and-frame filter press of 60 m$^2$ to obtain a filter cake, a filtrate and a washing solution, wherein the filter cake is a mixture of cobalt sulfide and nickel sulfide and is returned to the acid dissolution procedure, and the filtrate and the washing solution enter into a manganese precipitation procedure;

d, adjusting the pH of the filtrate and the washing solution obtained in the step c to 9.5 with solid sodium hydroxide, reacting for 120 min, precipitating manganese ions, filtering and washing the precipitates with the plate-and-frame filter press of 60 m$^2$ to obtain a manganese hydroxide filter cake and a lithium-containing filtrate and washing solution;

e, evaporating, concentrating and crystallizing the lithium-containing filtrate and washing solution to remove sodium sulfate and then obtain a concentrated lithium solution;

f, precipitating lithium carbonate with a saturated sodium carbonate solution, and filtering and washing to obtain a lithium carbonate filter cake and a lithium precipitation mother liquor;

g, returning the lithium precipitation mother liquor to the procedure of preparing the impurity-removed solution to be used as an alkali liquor for adjusting pH, to recover residual lithium ions in the lithium precipitation mother liquor.

Embodiment 5: a pre-extraction solution preparation process in comprehensive recovery of ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, pumping 15 m$^3$ of impurity-removed solution into a reaction kettle of 20 m$^3$, adjusting the pH to 6.0 with sodium hydroxide with a concentration of 32%, precipitating a mixture of cobalt hydroxide and nickel hydroxide, and filtering and washing with an automatic plate-and-frame filter press of 60 m$^2$ to obtain a filter cake, which is the mixture of cobalt hydroxide and nickel hydroxide;

c, dissolving the mixture of cobalt hydroxide and nickel hydroxide with sulfuric acid with a concentration of 80% in the reaction kettle of 20 m$^3$ to form a mixed solution of cobalt sulfate and nickel sulfate;

d, adjusting the pH of the mixed solution of cobalt sulfate and nickel sulfate to 5.0 with the mixture of cobalt hydroxide and nickel hydroxide, filtering with the automatic plate-and-frame filter press of 60 m$^2$ to obtain a filter cake, and returning the filter cake to the step c for continuing to dissolve;

e, pumping 15 m$^3$ of a mixed solution of cobalt sulfate and nickel sulfate into the reaction kettle of 20 m$^3$, adding fluoride according to 8 times of the total amount of calcium and magnesium ions in the solution, keeping the reaction temperature at 60° C., and reacting for 50 min to remove the calcium and magnesium ions;

f, filtering and washing, and allowing the filtrate to enter into a P204 impurity extraction procedure as a P204 pre-extraction solution.

Embodiment 6: a pre-extraction solution preparation process in comprehensive recovery of ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, pumping 15 m$^3$ of impurity-removed solution into a reaction kettle of 20 m$^3$, adjusting the pH to 5.8 with solid sodium hydroxide with a concentration of 98%, precipitating a mixture of cobalt hydroxide and nickel hydroxide, and filtering and washing with an automatic plate-and-frame filter press of 60 m² to obtain a filter cake, which is the mixture of cobalt hydroxide and nickel hydroxide;

c, dissolving the mixture of cobalt hydroxide and nickel hydroxide with sulfuric acid with a concentration of 50% in the reaction kettle of 20 m³ to form a mixed solution of cobalt sulfate and nickel sulfate;

d, adjusting the pH of the mixed solution of cobalt sulfate and nickel sulfate to 5.5 with the mixture of cobalt hydroxide and nickel hydroxide, filtering with the automatic plate-and-frame filter press of 60 m² to obtain a filter cake, and returning the filter cake to the step c for continuing to dissolve;

e, pumping 15 m³ of a mixed solution of cobalt sulfate and nickel sulfate into the reaction kettle of 20 m³, adding fluoride according to 5 times of the total amount of calcium and magnesium ions in the solution, keeping the reaction temperature at 70° C., and reacting for 30 min to remove the calcium and magnesium ions;

f, filtering and washing, and allowing the filtrate to enter into a P204 impurity extraction procedure as a P204 pre-extraction solution.

Embodiment 7: a pre-extraction solution preparation process in comprehensive recovery of ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, pumping 15 m³ of impurity-removed solution into a reaction kettle of 20 m³, adjusting the pH to 6.2 with sodium hydroxide solution with a concentration of 15%, precipitating a mixture of cobalt hydroxide and nickel hydroxide, and filtering and washing with an automatic plate-and-frame filter press of 60 m² to obtain a filter cake, which is the mixture of cobalt hydroxide and nickel hydroxide;

c, dissolving the mixture of cobalt hydroxide and nickel hydroxide with sulfuric acid with a concentration of 70% in the reaction kettle of 20 m³ to form a mixed solution of cobalt sulfate and nickel sulfate;

d, adjusting the pH of the mixed solution of cobalt sulfate and nickel sulfate to 5.2 with the mixture of cobalt hydroxide and nickel hydroxide, filtering with the automatic plate-and-frame filter press of 60 m² to obtain a filter cake, and returning the filter cake to the step c for continuing to dissolve;

e, pumping 15 m³ of a mixed solution of cobalt sulfate and nickel sulfate into the reaction kettle of 20 m³, adding fluoride according to 10 times of the total amount of calcium and magnesium ions in the solution, keeping the reaction temperature at 80° C., and reacting for 60 min to remove the calcium and magnesium ions;

f, filtering and washing, and allowing the filtrate to enter into a P204 impurity extraction procedure as a P204 pre-extraction solution.

Embodiment 8: a pre-extraction solution preparation process in comprehensive recovery of ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, pumping 15 m³ of impurity-removed solution into a reaction kettle of 20 m³, adjusting the pH to 6.1 with sodium hydroxide solution with a concentration of 10%, precipitating a mixture of cobalt hydroxide and nickel hydroxide, and filtering and washing with an automatic plate-and-frame filter press of 60 m² to obtain a filter cake, which is the mixture of cobalt hydroxide and nickel hydroxide;

c, dissolving the mixture of cobalt hydroxide and nickel hydroxide with sulfuric acid with a concentration of 60% in the reaction kettle of 20 m³ to form a mixed solution of cobalt sulfate and nickel sulfate;

d, adjusting the pH of the mixed solution of cobalt sulfate and nickel sulfate to 5.5 with the mixture of cobalt hydroxide and nickel hydroxide, filtering with the automatic plate-and-frame filter press of 60 m² to obtain a filter cake, and returning the filter cake to the step c for continuing to dissolve;

e, pumping 15 m³ of a mixed solution of cobalt sulfate and nickel sulfate into the reaction kettle of 20 m³, adding fluoride according to 6 times of the total amount of calcium and magnesium ions in the solution, keeping the reaction temperature at 70° C., and reacting for 45 min to remove the calcium and magnesium ions;

f, filtering and washing, and allowing the filtrate to enter into a P204 impurity extraction procedure as a P204 pre-extraction solution.

Embodiment 9: a method for comprehensive recovery of cobalt, nickel, manganese and lithium elements from the ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, adjusting the pH of the impurity-removed solution to 6.0 with solid sodium hydroxide with a concentration of 98%, precipitating the mixture of cobalt hydroxide and nickel hydroxide, filtering and washing to obtain a filter cake and a filtrate, and treating the filter cake and the filtrate respectively; c, slowly adding the mixture of cobalt hydroxide and nickel hydroxide into a sulfuric acid solution with a concentration of 80%, adjusting the pH to 5.5 with the mixture of cobalt hydroxide and nickel hydroxide; adding the physical fluoride according to 8 times of the total amount of calcium and magnesium ions in the dissolving solution, reacting for 60 min, filtering and washing to obtain a filter cake and a filtrate, wherein the filter cake is calcium-magnesium slag and is treated separately; allowing the filtrate to enter into the P204 impurity extraction procedure for impurity-removal extraction to extract and remove a small amount of manganese, iron, zinc and other impurities brought by the mixture of cobalt hydroxide and nickel hydroxide; allowing the raffinate mainly containing cobalt and nickel ions to enter into the P507 extraction procedure; performing P507 cobalt ion full extraction and full back-extraction to obtain a high-concentration pure solution of cobalt sulfate; evaporating and crystallizing the solution to prepare a battery-grade cobalt sulfate product; and allowing a nickel sulfate as the raffinate solution to enter into a CY272 impurity extraction procedure;

d, obtaining pure nickel sulfate liquid as the raffinate after the CY272 impurity extraction procedure, adjusting the pH to 10 with solid sodium hydroxide with the concentration of 98%, precipitating nickel hydroxide, reversely washing the precipitates with pure water for 3 times to obtain a filter cake, a filtrate and a washing solution, wherein the filter cake is battery-grade nickel hydroxide, and the filtrate and the washing solution are treated by a wastewater station for recycling;

e, adding solid sodium sulfide according to 2.0 times of the total amount of cobalt and nickel into the filtrate and the washing solution obtained in the step b, reacting for 60 min, filtering and washing to obtain a filter cake, a filtrate and a washing solution, wherein the filter cake is a mixture of cobalt sulfide and nickel sulfide and is returned to the acid dissolution procedure, and the filtrate and the washing solution enter into the manganese precipitation procedure;

f, adjusting the pH of the filtrate and the washing solution obtained in the step e to 10.0 with solid sodium hydroxide with the concentration of 98%, reacting for 60 min, filtering and washing to obtain a manganese hydroxide filter cake and a lithium-containing filtrate and washing solution;

g, evaporating, concentrating and centrifuging the lithium-containing filtrate and washing solution to remove crystallized sodium sulfate and obtain a concentrated lithium solution, precipitating lithium carbonate with sodium carbonate, filtering and washing to obtain a lithium carbonate filter cake and a lithium precipitation mother liquor, and returning the lithium precipitation mother liquor to the procedure of removing iron and aluminum to be used as an alkali liquor for adjusting pH.

Embodiment 10: a method for comprehensive recovery of cobalt, nickel, manganese and lithium elements from the ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, adjusting the pH of the impurity-removed solution to 5.8 with a sodium hydroxide solution with a concentration of 32%, precipitating the mixture of cobalt hydroxide and nickel hydroxide, filtering and washing to obtain a filter cake and a filtrate, and treating the filter cake and the filtrate respectively;

c, slowly adding the mixture of cobalt hydroxide and nickel hydroxide into a sulfuric acid solution with a concentration of 50%, adjusting the pH to 6.0 with the mixture of cobalt hydroxide and nickel hydroxide; adding the physical fluoride according to 5 times of the total amount of calcium and magnesium ions in the dissolving solution, reacting for 50 min, filtering and washing to obtain a filter cake and a filtrate, wherein the filter cake is calcium-magnesium slag and is treated separately; allowing the filtrate to enter into the P204 impurity extraction procedure for impurity-removal extraction to extract and remove a small amount of manganese, iron, zinc and other impurities brought by the mixture of cobalt hydroxide and nickel hydroxide; allowing the raffinate mainly containing cobalt and nickel ions to enter into the P507 extraction procedure; performing P507 cobalt ion full extraction and full back-extraction to obtain a high-concentration pure solution of cobalt sulfate; evaporating and crystallizing the solution to prepare a battery-grade cobalt sulfate product; and allowing a nickel sulfate as the raffinate solution to enter into a CY272 impurity extraction procedure;

d, obtaining pure nickel sulfate liquid as the raffinate after the CY272 impurity extraction procedure, adjusting the pH to 10 with a sodium hydroxide solution with the concentration of 32%, precipitating nickel hydroxide, reversely washing the precipitates with pure water for 3 times to obtain a filter cake, a filtrate and a washing solution, wherein the filter cake is battery-grade nickel hydroxide, and the filtrate and the washing solution are treated by a wastewater station for recycling;

e, adding solid sodium sulfide according to 3.0 times of the total amount of cobalt and nickel into the filtrate and the washing solution obtained in the step b, reacting for 30 min, filtering and washing to obtain a filter cake, a filtrate and a washing solution, wherein the filter cake is a mixture of cobalt sulfide and nickel sulfide and is returned to the acid dissolution procedure, and the filtrate and the washing solution enter into the manganese precipitation procedure;

f, adjusting the pH of the filtrate and the washing solution obtained in the step e to 9.0 with a sodium hydroxide solution with the concentration of 32%, reacting for 60 min, filtering and washing to obtain a manganese hydroxide filter cake and a lithium-containing filtrate and washing solution;

g, evaporating, concentrating and centrifuging the lithium-containing filtrate and washing solution to remove crystallized sodium sulfate and obtain a concentrated lithium solution, precipitating lithium carbonate with sodium carbonate, filtering and washing to obtain a lithium carbonate filter cake and a lithium precipitation mother liquor, and returning the lithium precipitation mother liquor to the procedure of removing iron and aluminum to be used as an alkali liquor for adjusting pH.

Embodiment 11: a method for comprehensive recovery of cobalt, nickel, manganese and lithium elements from the ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, adjusting the pH of the impurity-removed solution to 6.2 with a sodium hydroxide solution with a concentration of 15%, precipitating the mixture of cobalt hydroxide and nickel hydroxide, filtering and washing to obtain a filter cake and a filtrate, and treating the filter cake and the filtrate respectively;

c, slowly adding the mixture of cobalt hydroxide and nickel hydroxide into a sulfuric acid solution with a concentration of 70%, adjusting the pH to 5.0 with the mixture of cobalt hydroxide and nickel hydroxide; adding the physical fluoride according to 10 times of the total amount of calcium and magnesium ions in the dissolving solution, reacting for 30 min, filtering and washing to obtain a filter cake and a filtrate, wherein the filter cake is calcium-magnesium slag and is treated separately; allowing the filtrate to enter into the P204 impurity extraction procedure for impurity-removal extraction to extract and remove a small amount of manganese, iron, zinc and other impurities brought by the mixture of cobalt hydroxide and nickel hydroxide; allowing the raffinate mainly containing cobalt and nickel ions to enter into the P507 extraction procedure; performing P507 cobalt ion full extraction and full back-extraction to obtain a high-concentration pure solution of cobalt sulfate; evaporating and crystallizing the solution to prepare a battery-grade cobalt sulfate product; and allowing a nickel sulfate as the raffinate solution to enter into a CY272 impurity extraction procedure;

d, obtaining pure nickel sulfate liquid as the raffinate after the CY272 impurity extraction procedure, adjusting the pH to 9 with a sodium hydroxide solution with the concentration of 15%, precipitating nickel hydroxide, reversely washing the precipitates with pure water for 3 times to obtain a filter cake, a filtrate and a washing solution, wherein the filter cake is battery-grade nickel hydroxide, and the filtrate and the washing solution are treated by a wastewater station for recycling;

e, adding solid sodium sulfide according to 3.5 times of the total amount of cobalt and nickel into the filtrate and the washing solution obtained in the step b, reacting for 40 min, filtering and washing to obtain a filter cake, a filtrate and a washing solution, wherein the filter cake is a mixture of cobalt sulfide and nickel sulfide and is returned to the acid dissolution procedure, and the filtrate and the washing solution enter into the manganese precipitation procedure;

f, adjusting the pH of the filtrate and the washing solution obtained in the step e to 8.5 with a sodium hydroxide solution with the concentration of 15%, reacting for 60 min, filtering and washing to obtain a manganese hydroxide filter cake and a lithium-containing filtrate and washing solution;

g, evaporating, concentrating and centrifuging the lithium-containing filtrate and washing solution to remove crystallized sodium sulfate and obtain a concentrated lithium solution, precipitating lithium carbonate with sodium carbonate, filtering and washing to obtain a lithium carbonate filter cake and a lithium precipitation mother liquor, and returning the lithium precipitation mother liquor to the procedure of removing iron and aluminum to be used as an alkali liquor for adjusting pH.

Embodiment 12: a method for comprehensive recovery of cobalt, nickel, manganese and lithium elements from the ternary battery wastes includes the following steps:

a, disassembling waste ternary batteries to obtain waste ternary battery powder, and leaching the waste ternary battery powder with an acid for removing copper, iron and aluminum to obtain an impurity-removed solution;

b, adjusting the pH of the impurity-removed solution to 6.1 with a sodium hydroxide solution with a concentration of 20%, precipitating the mixture of cobalt hydroxide and nickel hydroxide, filtering and washing to obtain a filter cake and a filtrate, and treating the filter cake and the filtrate respectively;

c, slowly adding the mixture of cobalt hydroxide and nickel hydroxide into a sulfuric acid solution with a concentration of 60%, adjusting the pH to 5.5 with the mixture of cobalt hydroxide and nickel hydroxide; adding the physical fluoride according to 6 times of the total amount of calcium and magnesium ions in the dissolving solution, reacting for 45 min, filtering and washing to obtain a filter cake and a filtrate, wherein the filter cake is calcium-magnesium slag and is treated separately; allowing the filtrate to enter into the P204 impurity extraction procedure for impurity-removal extraction to extract and remove a small amount of manganese, iron, zinc and other impurities brought by the mixture of cobalt hydroxide and nickel hydroxide; allowing the raffinate mainly containing cobalt and nickel ions to enter into the P507 extraction procedure; performing P507 cobalt ion full extraction and full back-extraction to obtain a high-concentration pure solution of cobalt sulfate; evaporating and crystallizing the solution to prepare a battery-grade cobalt sulfate product; and allowing a nickel sulfate as the raffinate solution to enter into a CY272 impurity extraction procedure;

d, obtaining pure nickel sulfate liquid as the raffinate after the CY272 impurity extraction procedure, adjusting the pH to 9.5 with a sodium hydroxide solution with the concentration of 20%, precipitating nickel hydroxide, reversely washing the precipitates with pure water for 3 times to obtain a filter cake, a filtrate and a washing solution, wherein the filter cake is battery-grade nickel hydroxide, and the filtrate and the washing solution are treated by a wastewater station for recycling;

e, adding solid sodium sulfide according to 4.0 times of the total amount of cobalt and nickel into the filtrate and the washing solution obtained in the step b, reacting for 45 min, filtering and washing to obtain a filter cake, a filtrate and a washing solution, wherein the filter cake is a mixture of cobalt sulfide and nickel sulfide and is returned to the acid dissolution procedure, and the filtrate and the washing solution enter into the manganese precipitation procedure;

f, adjusting the pH of the filtrate and the washing solution obtained in the step e to 9.5 with a sodium hydroxide solution with the concentration of 20%, reacting for 60 min, filtering and washing to obtain a manganese hydroxide filter cake and a lithium-containing filtrate and washing solution;

g, evaporating, concentrating and centrifuging the lithium-containing filtrate and washing solution to remove crystallized sodium sulfate and obtain a concentrated lithium solution, precipitating lithium carbonate with sodium carbonate, filtering and washing to obtain a lithium carbonate filter cake and a lithium precipitation mother liquor, and returning the lithium precipitation mother liquor to the procedure of removing iron and aluminum to be used as an alkali liquor for adjusting pH.

Experimental data related to the present invention are shown as follows:

TABLE 1

Table of related detection data of the present invention:

| | Impurity-removed solution (beginning of procedure change) | Data analysis (liquid g/L, solid %) | | | | | | |
|---|---|---|---|---|---|---|---|---|
| | | Co | Ni | Mn | Li | Cu | Mg | Nu |
| Liquid raw material | | 9.29 | 22.47 | 12.66 | 6.14 | 0.021 | 0.18 | 17.48 |
| Cobalt and nickel-precipitated solution | PH6.0 | 0.87 | 0.68 | 11.98 | 5.97 | 0.069 | 0.17 | 41.55 |
| | PH5.8 | 1.37 | 1.30 | 10.89 | 5.37 | 0.078 | 0.14 | 44.64 |
| | PH6.2 | 0.16 | 0.14 | 7.29 | 4.48 | 0.077 | 0.16 | 44.66 |
| | PH6.1 | 0.36 | 0.47 | 8.53 | 4.67 | 0.071 | 0.12 | 44.08 |
| Cobalt hydroxide and nickel hydroxide (filter cake) | PH6.0 | 6.18 | 15.99 | 0.50 | 0.12 | 0.078 | 0.14 | 4.64 |
| | PH5.8 | 5.85 | 15.82 | 0.42 | 0.13 | 0.077 | 0.16 | 4.66 |
| | PH6.2 | 5.99 | 14.70 | 3.54 | 0.11 | 0.071 | 0.12 | 4.05 |
| | PH6.1 | 6.07 | 15.01 | 2.82 | 0.12 | 0.068 | 0.15 | 4.16 |

TABLE 1-continued

Table of related detection data of the present invention:

| Liquid raw material | Impurity-removed solution (beginning of procedure change) | Data analysis (liquid g/L, solid %) | | | | | | |
|---|---|---|---|---|---|---|---|---|
| | | Co 9.29 | Ni 22.47 | Mn 12.66 | Li 6.14 | Cu 0.021 | Mg 0.18 | Nu 17.48 |
| Cobalt hydroxide and nickel hydroxide-dissolved solution | Sulfuric acid with the concentration of 80% | 20.93 | 54.16 | 1.69 | 0.406 | 0.032 | 0.082 | 15.72 |
| | Sulfuric acid with the concentration of 50% | 19.67 | 53.19 | 1.41 | 0.437 | 0.035 | 0.065 | 14.96 |
| | Sulfuric acid with the concentration of 70% | 22.5 | 55.23 | 13.3 | 0.413 | 0.030 | 0.069 | 15.21 |
| | Sulfuric acid with the concentration of 60% | 21.16 | 52.32 | 9.83 | 0.39 | 0.036 | 0.088 | 14.44 |
| Calcium and magnesium-removed solution | Sodium fluoride 8 times | 20.90 | 54.10 | 1.68 | 0.40 | 0.005 | 0.005 | 15.75 |
| | Sodium fluoride 5 times | 19.62 | 53.17 | 1.40 | 0.43 | 0.005 | 0.005 | 15.51 |
| | Sodium fluoride 10 times | 20.48 | 55.20 | 8.25 | 0.40 | 0.005 | 0.005 | 15.28 |
| | Sodium fluoride 6 times | 21.00 | 52.14 | 9.62 | 0.39 | 0.005 | 0.005 | 14.24 |
| Sulfurized cobalt and nickel-recovered solution | Sodium sulfide 2 times | 0.016 | 0.011 | 11.98 | 5.97 | 0.069 | 0.17 | 42.01 |
| | Sodium sulfide 3 times | 0.011 | 0.009 | 10.89 | 5.37 | 0.078 | 0.14 | 44.88 |
| | Sodium sulfide 3.5 times | 0.008 | 0.007 | 7.29 | 4.48 | 0.077 | 0.16 | 45.21 |
| | Sodium sulfide 4.0 times | 0.005 | 0.005 | 8.53 | 4.67 | 0.071 | 0.12 | 44.68 |
| Manganese hydroxide precipitates (filter cake) | PH10.0 | 0.030 | 0.021 | 22.54 | 0.01 | 0.001 | 0.001 | 4.23 |
| | PH9.0 | 0.022 | 0.018 | 22.52 | 0.01 | 0.001 | 0.001 | 4.32 |
| | PH8.5 | 0.024 | 0.022 | 22.41 | 0.01 | 0.001 | 0.001 | 4.21 |
| | PH9.5 | 0.016 | 0.016 | 22.67 | 0.01 | 0.001 | 0.001 | 4.68 |
| Nickel hydroxide precipitates (filter cake) subjected to three-stage reverse washing | CY272 impurity extraction raffinate | 0.0012 | 47.15 | 0.0016 | 0.001 | 0.001 | 0.001 | 44.62 |
| | PH10.0 | 0.0025 | 18.21 | 0.0015 | 0.001 | 0.0011 | 0.001 | 0.01 |
| | PH9.0 | 0.0024 | 18.45 | 0.0016 | 0.001 | 0.0011 | 0.001 | 0.01 |
| | PH8.5 | 0.0015 | 18.55 | 0.0021 | 0.001 | 0.0011 | 0.001 | 0.01 |
| | PH9.5 | 0.0017 | 18.28 | 0.0020 | 0.001 | 0.0011 | 0.001 | 0.01 |

TABLE 2-1

Table for auxiliary raw materials consumed after procedure change:

| Consumed material | | Consumed material (kg) | | | | | | |
|---|---|---|---|---|---|---|---|---|
| Liquid raw material | Impurity-removed solution (beginning of procedure change) | Solid sodium hydroxide 9.29 | Liquid sodium hydroxide 22.47 | Sulfuric acid 12.66 | Hydrochloric acid 6.14 | Sodium fluoride 0.021 | Sodium sulfide 0.18 | Na |
| Cobalt and nickel-precipitated solution | PH6.0 | 754.1 | | | | | | |
| | PH5.8 | | 2239.3 | | | | | |
| | PH6.2 | | 2802.2 | | | | | |
| | PH6.1 | | 2671.8 | | | | | |
| Cobalt hydroxide and nickel hydroxide-dissolved solution | Sulfuric acid with the concentration of 80% | | | 923.6 | | | | |
| | Sulfuric acid with the concentration of 50% | | | 878.1 | | | | |
| | Sulfuric acid with the concentration of 70% | | | 1037.8 | | | | |
| | Sulfuric acid with the concentration of 60% | | | 1047.8 | | | | |
| Calcium and magnesium-removed solution | Sodium fluoride 8 times | | | | | 16.4 | | |
| | Sodium fluoride 5 times | | | | | 10.3 | | |
| | Sodium fluoride 10 times | | | | | 22.8 | | |
| | Sodium fluoride 6 times | | | | | 13.68 | | |
| Sulfurized cobalt and nickel-recovered solution | Sodium sulfide 2 times | | | | | | 55.8 | |
| | Sodium sulfide 3 times | | | | | | 83.7 | |
| | Sodium sulfide 3.5 times | | | | | | 18.9 | |
| | Sodium sulfide 4.0 times | | | | | | 59.8 | |
| Manganese hydroxide precipitates (filter cake) | PH10.0 | 319.5 | | | | | | |
| | PH9.0 | | 1008.3 | | | | | |
| | PH8.5 | | 607.5 | | | | | |
| | PH9.5 | | 710.8 | | | | | |
| Nickel hydroxide | PH10.0 | 581.03 | | | | | | |
| | PH9.0 | | 4430.8 | | | | | |

TABLE 2-1-continued

Table for auxiliary raw materials consumed after procedure change:

| Liquid raw material | Consumed material Impurity-removed solution (beginning of procedure change) | Solid sodium hydroxide | Liquid sodium hydroxide | Sulfuric acid | Hydrochloric acid | Sodium fluoride | Sodium sulfide | |
|---|---|---|---|---|---|---|---|---|
| | | 9.29 | 22.47 | 12.66 | 6.14 | 0.021 | 0.18 | Na |
| precipitates (filter cake) | PH8.5 PH9.5 | | 4906.7 1678.0 | | | | | |
| Total | | 1654.9 | | 923.6 | | 16.4 | 55.8 | |

Note:
1. The raw material in the Table is 18 m³ of impurity-removed solution, wherein the contents of all elements are shown as follows:

| Liquid raw material | Impurity-removed solution (beginning of procedure change) (g/L) | Co | Ni | Mn | Li | Ca | Mg | Na |
|---|---|---|---|---|---|---|---|---|
| | | 9.29 | 22.47 | 12.66 | 6.14 | 0.021 | 0.18 | 17.48 |

That is, the impurity-removed solution contains 167.22 kg of Co, 404.46 kg of Ni, 227.88 kg of Mn and 110.52 kg of Li.

2. Only 167.22 kg of Co will be subjected to full extraction and full back-extraction in the present invention.

3. According to the traditional procedure, the metals for full extraction and full back-extraction include cobalt, nickel and manganese, in a total of 799.56 kg.

TABLE 2-2

Table for auxiliary raw materials (18 M³ of impurity-removed solution) consumed in full extraction and full back-extraction of metals in traditional procedure:

| Name of metal | Sodium hydrochloric | Sulfuric acid | Hydrochloric acid | Extractant | Remarks |
|---|---|---|---|---|---|
| Co | 3390 × 0.17 = 576 | 3322 × 0.17 = 564 | 56.4 | Not included | |
| Ni | 3390 × 0.41 = 1390 | 3322 × 0.41 = 1362 | 136.0 | | |
| Mn | 3390 × 0.23 = 779 | 3322 × 0.23 = 764 | 76.4 | | |
| Total | 2745 | 2690 | 268.8 | | |

Note:
3390 and 3322 refer to the actual production data of the amount of sodium hydroxide and sulfuric acid consumed in extracting per ton of metal with the process of full extraction and full back-extraction by the applicant.

TABLE 2-3

Comparison table of auxiliary raw materials (18 m³ of impurity-removed solution) consumed in the present invention and the traditional procedure of full extraction and full back-extraction:

| Procedure | Sodium hydroxide | Sulfuric acid | Hydrochloric acid | Remarks |
|---|---|---|---|---|
| Full extraction and full back-extraction | 2745 | 2690 | 268.8 | |
| The present invention | 2230.9 | 1487.6 | 56.4 | Full extraction and full back-extraction data |
| The present invention saves | 514.1 | 1202.4 | 212.4 | of the contained cobalt The quantity of saved auxiliary materials |

Note:
The data in the Table only compare the part of the traditional procedure, which requires full extraction and full back-extraction.

The above are only illustrative embodiments of the present invention, and not any formal or substantial limitation to the present invention. It should be pointed out that some improvements and supplements made by those skilled in the art without departing from the method of the present invention should also be regarded as the protection scope of the present invention. Equivalent variations for some changes, modifications and evolutions made by making use of the technical contents described above by those skilled in the art without departing from the spirit and scope of the present invention should be considered as equivalent embodiments of the present invention. Meanwhile, all changes, modifications and evolutions for the equivalent variations performed on the above embodiments according to the essential technology of the present invention still fall within the protection scope of the present invention.

INDUSTRIAL PRACTICABILITY

After a lot of tests, compared with the existing technology of full extraction and full back-extraction, the method provided by the present invention significantly reduces the consumption of raw and auxiliary materials (as shown in Tables 2-3), and can save 18.72% of sodium hydroxide, 44.70% of sulfuric acid and 79.12% of hydrochloric acid. The technology of the present invention has been officially put into production in September, 2019, and reduces the comprehensive production cost by 15% on average compared with the technology of full extraction and full back-extraction.

We claim:

1. A method for comprehensive recovery of cobalt, nickel, manganese and lithium elements from ternary battery wastes, comprising the following steps:
   a, disassembling waste ternary batteries to obtain waste ternary battery powder, and leaching the waste ternary battery powder with an acid for removing copper, iron and aluminum to obtain an impurity-removed solution;
   b, adjusting a pH of the impurity-removed solution to 5.5-6.5 with sodium hydroxide, precipitating a mixture of cobalt hydroxide and nickel hydroxide, filtering and washing to obtain a filter cake and a filtrate, and treating the filter cake and the filtrate respectively;
   c, dissolving the filter cake, which is a mixture of cobalt hydroxide and nickel hydroxide, with sulfuric acid, then, adjusting the pH to 5.0-6.0, adding fluoride into the dissolving solution to remove calcium and magnesium ions, filtering and washing to obtain a filtrate, allowing the filtrate to enter into a first impurity extraction procedure, removing impurities deeply, allowing raffinate to enter into a second extraction procedure, performing the second extraction procedure cobalt ion full extraction and full back-extraction to obtain a high-concentration pure solution of cobalt sulfate, evaporating and crystallizing the solution to obtain a battery-grade cobalt sulfate product, and allowing a nickel sulfate solution as the raffinate to enter into a third impurity extraction procedure;
   d, obtaining pure nickel sulfate liquid as the raffinate after the third impurity extraction procedure, adjusting the pH to 6-10 with sodium hydroxide, precipitating nickel hydroxide, reversely washing the precipitates with pure water for 2-4 times to obtain a filter cake which is battery-grade nickel hydroxide, and treating the filtrate and the washing solution by a wastewater station for recycling;
   e, adding sodium sulfide into the filtrate and the washing solution obtained in step b to remove the residual cobalt and nickel ions, filtering and washing to obtain a filter cake which is a mixture of cobalt sulfide and nickel sulfide, returning to the acid dissolution procedure, and allowing the filtrate and the washing solution to enter into the manganese precipitation procedure; and
   in step e of adding sodium sulfide, solid sodium sulfide is added by 2.0-5.0 times of the total amount of cobalt and nickel in the filtrate and the washing solution obtained in step b; and the reaction lasts for 30-60 minutes to recover the residual cobalt and nickel ions;
   f, adjusting the pH of the filtrate and the washing solution obtained in step e to 8-11 with sodium hydroxide, to precipitate manganese ions, filtering and washing to obtain a manganese hydroxide filter cake and a lithium-containing filtrate and washing solution;
   g, evaporating and crystallizing sodium sulfate from the lithium-containing filtrate and washing solution to obtain a concentrated lithium solution, precipitating lithium carbonate with sodium carbonate, filtering and washing to obtain a lithium carbonate filter cake and a lithium precipitation mother liquor.

2. The method for comprehensive recovery of cobalt, nickel, manganese and lithium elements from the ternary battery wastes of claim 1, wherein the sodium hydroxide is liquid alkali with a concentration of less than 32% or solid sodium hydroxide.

3. The method for comprehensive recovery of cobalt, nickel, manganese and lithium elements from ternary battery wastes of claim 1, wherein the pH of the impurity-removed solution is adjusted to 6-6.2 with sodium hydroxide.

4. The method for comprehensive recovery of cobalt, nickel, manganese and lithium elements from the ternary battery wastes according to claim 1, wherein the concentration of the sulfuric acid is 5-80%.

5. The method for comprehensive recovery of cobalt, nickel, manganese and lithium elements from the ternary battery wastes according to claim 4, wherein the concentration of the sulfuric acid is 30-78%.

6. The method for comprehensive recovery of cobalt, nickel, manganese and lithium elements from ternary battery wastes of claim 1, wherein in adding fluoride to remove calcium and magnesium ions, fluoride is added for 5-10 times of a total amount of calcium and magnesium ions in the dissolving solution; and the reaction lasts for 10-60 min to precipitate calcium and magnesium ions.

7. The method for comprehensive recovery of cobalt, nickel, manganese and lithium elements from the ternary battery wastes according to claim 6, wherein the fluoride is one of sodium fluoride, ammonium fluoride and potassium fluoride.

* * * * *